B. M. MOOERS AND L. E. WARNER.
ELECTRIC CIRCUIT PROTECTING APPARATUS.
APPLICATION FILED MAR. 1, 1918.
1,381,581.
Patented June 14, 1921.
2 SHEETS—SHEET 1.
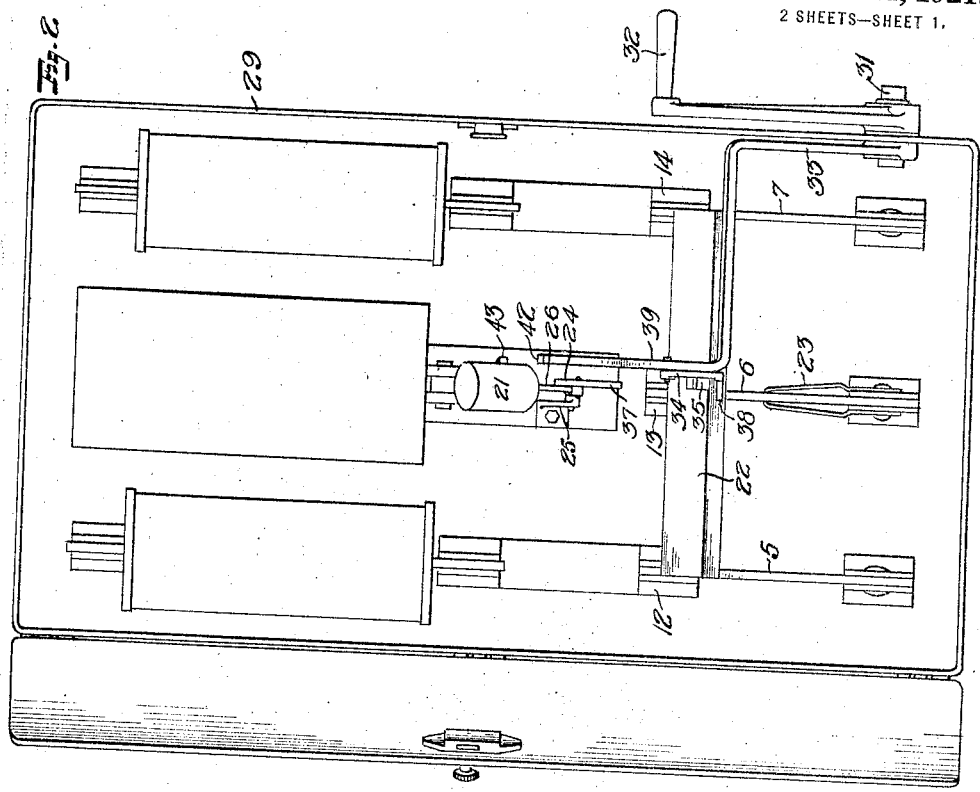
WITNESS
J. B. Gardner
INVENTOR.
B. M. MOOERS
L. E. WARNER
BY
White & Prost
ATTORNEYS

UNITED STATES PATENT OFFICE.

BENJAMIN M. MOOERS, OF SAN FRANCISCO, AND LAWRENCE E. WARNER, OF BERKELEY, CALIFORNIA, ASSIGNORS TO MOTOR PROTECTOR MFG. CO., OF SAN FRANCISCO, CALIFORNIA, A CORPORATION OF CALIFORNIA.

ELECTRIC-CIRCUIT-PROTECTING APPARATUS.

1,381,581.  Specification of Letters Patent.  Patented June 14, 1921.

Application filed March 1, 1918. Serial No. 219,749.

*To all whom it may concern:*

Be it known that we, BENJAMIN M. MOOERS and LAWRENCE E. WARNER, citizens of the United States, and residents, respectively, of the city and county of San Francisco, and of Berkeley, county of Alameda, both in the State of California, have invented a certain new and useful Electric-Circuit-Protecting Apparatus, of which the following is a specification.

The invention relates to apparatus for opening an electric circuit when certain electrical conditions obtain in said circuit.

An object of the invention is to provide an apparatus which is operated either by a deleterious overload on the electrical apparatus in circuit or a decrease of voltage in the circuit below a given voltage, to open the circuit.

A further object of the invention is to provide means for preventing the circuit from being closed and held closed when either the voltage or overload conditions mentioned exist.

The invention possesses other advantageous features, some of which, with the foregoing, will be set forth at length in the following description where we shall outline in full that form of the invention which we have selected for illustration in the drawings accompanying and forming part of the present specification. In said drawings we have shown one specific form of the apparatus of our invention, but it is to be understood that we do not limit ourselves to such form, since the invention, as expressed in the claims, may be embodied in a plurality of forms.

Referring to said drawings:

Figure 1 is a side elevation of one form of apparatus of our invention, the switch being shown open.

Fig. 2 is a front elevation of the apparatus shown in Fig. 1.

Figure 3:
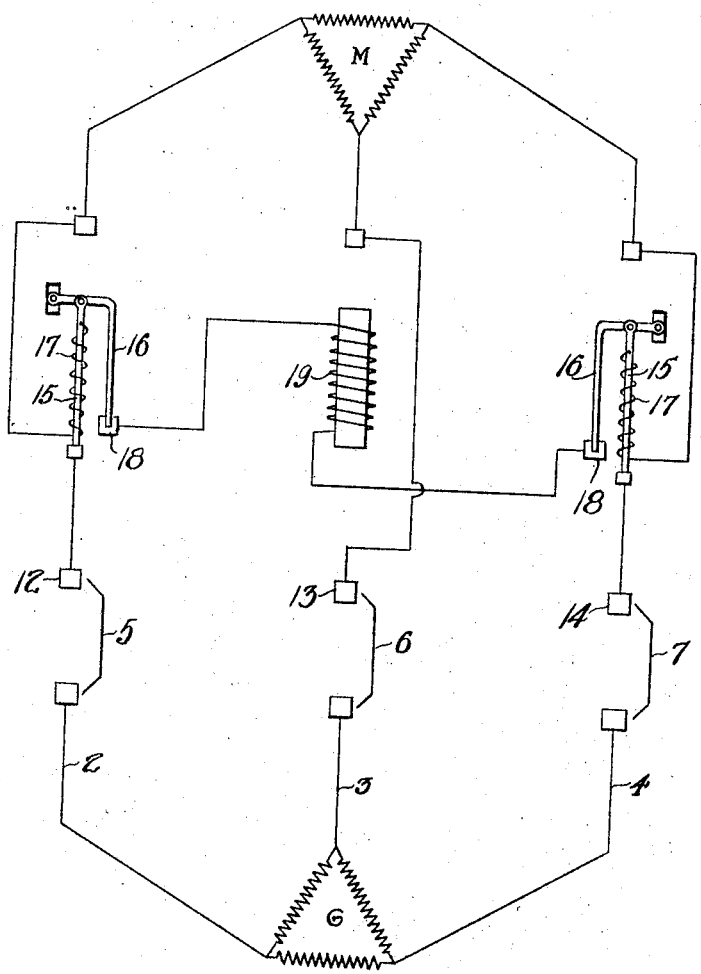
Fig. 3 is a diagrammatic representation of the electric circuits of the apparatus.

The apparatus of our invention is arranged in the circuit of the electrical apparatus to be protected and is designed to open the circuit when an overload which would be deleterious to the apparatus obtains, and when the voltage of the supply circuit falls below a predetermined minimum. The overload which would be deleterious to the apparatus is preferably measured by the temperature which it produces in the apparatus, or a selected portion thereof, and with the same current flowing in the device and in the apparatus when the predetermined maximum temperature obtains in the hottest part of the apparatus, the device of our invention operates to open the circuit.

In the present instance we will assume that the apparatus to be protected is the three phase alternating current motor M which is supplied with current from the generator G. The generator leads 2, 3 and 4 are connected to the lower ends of the switch blades 5, 6 and 7. The switch blades are adapted to contact respectively with the contact clips 12, 13 and 14 which are connected to the motor M. Arranged in two of the motor leads are thermostats of any suitable type, which when heated to a predetermined temperature operate to release the switch and cause it to open the circuit. In the present construction, each thermostat consists of a metallic bar 15, fixed at its lower end and pivoted at its upper end to the lever 16. The lower end of the bar 15 is connected to the contact clip of the switch and connected to and surrounding the bar is a heating coil 17, the free end of which is connected in the motor circuit. The bar and the heating coil are therefore arranged in series in the motor circuit, and the heating coil is made of such size and material and is so insulated from the surrounding atmosphere, that with the same current in the heating coil and in the motor winding the temperature of the bar corresponds directly at all times during the operation of the motor with the temperature of the hottest part of the windings of the motor. Arranged adjacent to and normally in contact with each lever 16, is a stationary contact 18, to which the ends of the electromagnet coil 19 are connected. The levers are electrically connected to the generator when the switch is closed and therefore, when the levers engage the contacts 18, the electromagnet is connected across the generator. The resistance or reactance of the electromagnet, however, is such that only a small current passes through the electromagnet, but as long as the temperature conditions in the thermostats are normal or below a predetermined maximum, the levers 16 remain in engagement with the contacts 18 and the electromagnet is energized. Should the temperature of the hottest portion of the motor windings increase above a predetermined temperature, the temperature of one or both of the thermostats will increase, causing an elongation of bar 15, which moves the lever 16 out of engagement with the contact 18, and thereby opens the circuit of the electromagnet. Associated with the electromagnet is an armature 21 which is held in a raised position by the flux in the energized electromagnet and when the circuit of the electromagnet is broken, the armature falls. Should the voltage in the circuit decrease, the pull of the electromagnet decreases, and the weight of the armature is so chosen, that when the voltage in the circuit reaches a predetermined minimum, the armature will fall.

The armature is associated with the switch in the circuit, so that when the armature falls, the switch is opened. The switch blades are connected together by a bar 22 of insulating material and are held in closed position against the force of the opening spring 23 by the pivoted latch 24 which engages the cross bar 22. Extending over the latch 24 is an arm 25 to which is pivoted a trigger 26, which engages in a slot 27 in the latch. The free end of the trigger extends upward above the arm and lies in the path of the armature 21, which is pivoted to the frame 28. When the armature falls, it strikes the trigger 26, causing the latch to be raised and the switch to be released. The weight of the armature is sufficient to hold the trigger depressed and the latch raised.

Means are provided for preventing the switch from being closed and held closed when the electromagnet circuit is open or when the supply voltage is below the minimum. The switch is inclosed in a locked case 29, so that access may not be had to it directly. Concentric with the pivots of the switch blades is a shaft 31 which extends through the case and which is provided on its outer end with a handle 32. Secured to the shaft 31 within the case or formed integrally therewith, is an arm 33 which is provided on its outer end with a spring-pressed latch 34 which is adapted to engage a clip 35 on the cross bar of the switch. The handle is normally in its downward position, so that when the switch flies out, the clip 35 comes in contact with the latch 34. By raising the handle, the switch is moved back to the closed position, but unless normal conditions exist in the apparatus and in the supply circuit, the switch will immediately fly out.

The latch 34 is provided with an arm 36 which when raised raises the latch out of contact with the clip 35, allowing the switch to spring back. Formed on the latch 24 is a curved projection 37 substantially concentric with the center of rotation of the shaft 31, over which the pin 38 on the end of the arm 36 moves as the handle is moved to bring the switch to closed position. Secured to the arm 33 is an extension 39 provided on its end with a blade 42, which, as the arm 33 is raised, passes under the latch 43 on the armature and raises the armature into contact with the electromagnet, allowing the latch 24 to drop and the trigger 26 to rise. The blade 42 is of such length that it moves out of contact with the latch 43 at the same time that the switch blades contact with the switch contacts. In the event that the electromagnet circuit is open at the thermostat or that the voltage is too low, the armature will drop onto the trigger 26, raise the latch 24 and its extension 39, which will raise the latch 34 and allow the switch blades to fly back. Should line and apparatus conditions be proper, the armature will remain in contact with the electromagnet, the latch 24 will engage and hold the switch and the handle may be moved back to its lower position. The latch 43 in the armature is preferably constructed as the ordinary spring-pressed door latch, so that it springs back out of the path of the blade 42 when the handle is returned to its lower position.

We claim:

1. A protective device for an electric circuit containing electrical apparatus, comprising an electromagnet connected across said circuit, a switch in said circuit, means operative by the opening of the electromagnet circuit for opening said switch, means controlled by the load on the apparatus for opening said electromagnet circuit, a handle for returning the switch to closed position and means operative during the time that the electromagnet circuit is open, for releasing the switch from the handle.

2. A protective device for an electric circuit containing electrical apparatus, comprising an electromagnet connected across said circuit, a switch in said circuit, means operative by a decrease in flux in said electromagnet to a predetermined minimum to open said switch, means operative by the current in the circuit for opening the switch, means for returning the switch to closed position, and means operative during the presence of said minimum flux for preventing the operation of the switch closing means.

3. A protective device for an electric circuit containing electrical apparatus, comprising a switch in said circuit, means operated by a reduction of voltage in said circuit to a predetermined value to open said switch, means controlled by the load on the apparatus to open said switch, a handle for closing said switch and means operative during the presence of the low voltage in the circuit and during the presence of an overload on the apparatus for releasing the switch from the handle.

4. A protective device for an electric circuit containing electrical apparatus, comprising a switch in said circuit, means operated by a reduction of voltage in said circuit to a predetermined value to open said switch, a thermostat in said circuit operative by an increase in temperature above a predetermined temperature to open said switch, a handle for closing said switch and means operative during the presence of said excess temperature in the thermostat and during the presence of the low voltage in the circuit, for releasing the switch from the handle.

5. A protective device for an electric circuit, comprising an electromagnet connected across said circuit, a switch in said circuit, an armature associated with said electromagnet and adapted to fall and release said switch when the flux through the electromagnet reaches a predetermined minimum, a handle for returning the switch to closed position and means operative by the closing movement of the handle for releasing the switch from the handle when the flux is below said minimum.

6. A protective device for an electric circuit, comprising an electromagnet arranged in said circuit, a switch in said circuit, an armature associated with said electromagnet and adapted when released from said electromagnet to fall and release said switch, and means for simultaneously raising said armature and closing said switch.

7. A protective device for an electric circuit, comprising an electromagnet arranged in said circuit, a switch in said circuit, an armature associated with said electromagnet and adapted when released from said electromagnet to fall and release said switch, and means for simultaneously raising said armature and moving said switch to closed position, said means being constructed to permit said armature to drop and release the switch from the closing means when the flux in said electromagnet is below a predetermined minimum.

In testimony whereof, we have hereunto set our hands at San Francisco, California, this 30th day of January, 1918, and this 9th day of February, 1918, respectively.

BENJAMIN M. MOOERS.
LAWRENCE E. WARNER.

In presence of—
H. G. Prost.